United States Patent
Li et al.

(10) Patent No.: US 7,067,182 B2
(45) Date of Patent: *Jun. 27, 2006

(54) LUBRICANT COATED BEVERAGE CONTAINER OR CONVEYOR THEREFOR

(75) Inventors: Minyu Li, Oakdale, MN (US); Robert D. P. Hei, Baldwin, WI (US); Keith D. Lokkesmoe, Savage, MN (US); Keith Edward Olson, Apple Valley, MN (US)

(73) Assignee: Ecolab Inc., Saint Paul, MN (US)

( * ) Notice: Subject to any disclaimer, the term of this patent is extended or adjusted under 35 U.S.C. 154(b) by 392 days.

This patent is subject to a terminal disclaimer.

(21) Appl. No.: 10/260,444

(22) Filed: Sep. 27, 2002

(65) Prior Publication Data

US 2003/0118744 A1 Jun. 26, 2003

Related U.S. Application Data

(62) Division of application No. 09/604,469, filed on Jun. 27, 2000, now Pat. No. 6,485,794.
(60) Provisional application No. 60/142,908, filed on Jul. 9, 1999.

(51) Int. Cl.
C08J 7/04 (2006.01)

(52) U.S. Cl. .................. 428/35.7; 428/421; 508/181; 508/208; 508/433; 508/579; 508/588; 508/583

(58) Field of Classification Search ............. 428/35.7, 428/421; 508/181, 208, 433, 579, 583, 588
See application file for complete search history.

(56) References Cited

U.S. PATENT DOCUMENTS

| | | |
|---|---|---|
| 3,213,024 A | 10/1965 | Blake et al. |
| 3,514,314 A | 5/1970 | Nemeth |
| 4,227,980 A | 10/1980 | Pregitzer et al. |
| 4,264,650 A | 4/1981 | Schulze et al. |
| 4,436,200 A | 3/1984 | Hodlewsky et al. |
| 4,555,543 A | 11/1985 | Effenberger et al. |

(Continued)

FOREIGN PATENT DOCUMENTS

| | | |
|---|---|---|
| CA | 1157456 | 11/1983 |
| DE | 197 20 292 C1 | 6/1998 |
| GB | 1056042 | 1/1967 |
| GB | 1564128 | 4/1980 |
| JP | 57003892 | 1/1982 |
| NL | 9300742 | 12/1994 |
| WO | WO 98/51746 | * 11/1998 |

OTHER PUBLICATIONS

"The Alternative to Soap and Water for Lubricating Conveyor Lines", *Food & Drink Business*, pp. 35–36 (Jan. 1998).

"Environmental Stress Cracking in PET Beverage Containers," Eric J. Moskala, Ph.D., presented at Bev–Pak Americas '96.

Primary Examiner—Sandra M. Nolan
(74) Attorney, Agent, or Firm—IPLM Group, P.A.

(57) ABSTRACT

The passage of a container along a conveyor is lubricated by applying to the container or conveyor a lubricating coating that is thermally cured at less than 200° C. or radiation-cured. The mixture can be applied in relatively low amounts and with relatively low or no water content, to provide thin, substantially non-dripping, renewable lubricating films. In contrast to dilute aqueous lubricants, the lubricants of the invention provide dry lubrication of the conveyors and containers, a cleaner conveyor line and reduced lubricant usage, thereby reducing waste, cleanup and disposal problems.

22 Claims, 1 Drawing Sheet

U.S. PATENT DOCUMENTS

| | | | |
|---|---|---|---|
| 4,556,589 A * | 12/1985 | Neumann et al. | 428/35 |
| 4,828,727 A | 5/1989 | McAninch | |
| 4,855,162 A | 8/1989 | Wrasidlo et al. | |
| 4,929,375 A | 5/1990 | Rossio et al. | |
| 4,944,889 A | 7/1990 | Awad | |
| 5,030,323 A | 7/1991 | Awad | |
| 5,064,500 A | 11/1991 | Awad | |
| 5,080,814 A | 1/1992 | Awad | |
| 5,145,721 A | 9/1992 | Kojima et al. | |
| 5,182,035 A | 1/1993 | Schmidt et al. | |
| 5,317,061 A | 5/1994 | Chu et al. | |
| 5,334,322 A | 8/1994 | Williams | |
| 5,352,376 A | 10/1994 | Gutzmann | |
| 5,389,199 A | 2/1995 | Awad et al. | |
| 5,453,451 A * | 9/1995 | Sokol | 522/42 |
| 5,486,316 A | 1/1996 | Bershas et al. | |
| 5,559,087 A | 9/1996 | Halsrud et al. | |
| 5,633,131 A | 5/1997 | Heym et al. | |
| 5,672,401 A | 9/1997 | Anglin et al. | |
| 5,886,066 A * | 3/1999 | Forschirm | 523/200 |
| 6,250,458 B1 * | 6/2001 | Shibayama et al. | 198/851 |
| 6,591,970 B1 * | 7/2003 | Olson et al. | 198/500 |

* cited by examiner

LUBRICANT COATED BEVERAGE CONTAINER OR CONVEYOR THEREFOR

CROSS-REFERENCE TO RELATED APPLICATIONS

This application is divisional of application Ser. No. 09/604,469 filed Jun. 27, 2000, now U.S. Pat. No. 6,485,794 B1, and claims the benefit of the filing date of provisional application Ser. No. 60/142,908, filed Jul. 9, 1999.

FIELD OF THE INVENTION

The present invention relates to lubricant compositions, and to their use, for example, to coat beverage containers or conveyor systems for beverage containers. The invention also relates to beverage containers and conveyor systems treated with such lubricant compositions.

DESCRIPTION OF RELATED ART

In the commercial distribution of most beverages, the beverages are packaged in containers of varying sizes made of a variety of materials. In most packaging operations, the containers are moved along conveying systems, usually in an upright position with the opening of the container facing vertically up or down, and moved from station to station, where various operations, such as filling, capping, labeling, sealing, and the like, are performed.

Lubricants are often used on conveying systems in the beverage industry during the filling of containers with beverages. There are a number of different attributes, that are desirable for such lubricants. For example, the lubricant should provide an acceptable level of lubricity for the system. For containers made from plastics such as polyethylene terephthalate (PET), the lubricant should not cause environmental stress cracking (crazing and cracking that occurs when the plastic polymer is under tension). It is also desirable that the lubricant have a viscosity which allows it to be applied by conventional pumping or application apparatus, such as sprayers, roll coaters, wet bed coaters, and the like, commonly used in the industry.

It is also important that the lubricant be compatible with the beverage so that the lubricant does not form solid deposits when it accidentally contacts spilled beverages on the conveyor system. This is important since the formation of deposits on the conveyor system may change the lubricity of the system and could require shutdown of the equipment to facilitate cleaning. Unfortunately, many currently-used lubricants contain ingredients that react with, for example, carbonated beverages to form such deposits.

SUMMARY OF THE INVENTION

The present invention provides, in one aspect, a beverage container or a conveyor for a beverage container, whose surface is coated at least in part with a coating that has been thermally cured at less than 200° C. or radiation-cured, whereby the cured coating forms a lubricant layer on the surface of the container or the conveyor.

The invention also provides a method for lubricating a beverage container, comprising applying to at least a portion of a surface of the beverage container a thermal or radiation curable coating, and thermally curing the coating at less than 200° C. or radiation curing the coating to provide a lubricant layer on the surface of the container.

The invention also provides a method for lubricating a conveyor system used to transport beverage containers, comprising applying a thermal or radiation curable coating to at least part of the conveying surface of a conveyor and then thermally curing the coating at less than 200° C. or radiation curing the coating to provide a lubricant layer on the conveying surface.

In addition, the invention provides a conveyor used to transport beverage containers, which is coated on portions that contact the container with a coating that has been thermally cured at less than 200° C. or radiation-cured, whereby the coating forms a lubricant layer on the conveyor.

The invention also provides thermal or radiation curable container or conveyor lubricating compositions comprising a film former that can be thermally cured at less than 200° C. or radiation-cured, a thermal initiator or photoinitiator, and at least 3 weight percent of lubricating fluoropolymer particles.

The compositions used in the invention can be applied in relatively low amounts and do not require in-line dilution with significant amounts of water. The compositions of the invention provide thin, dry lubricating films. In contrast to dilute aqueous lubricants, the lubricants of the invention provide dry lubrication of the conveyors and containers, a cleaner and drier conveyor line and working area, and reduced lubricant usage, thereby reducing waste, cleanup and disposal problems. Further features and advantages of the invention will become apparent from the detailed description that follows.

DETAILED DESCRIPTION OF PREFERRED EMBODIMENTS

Figure 1:
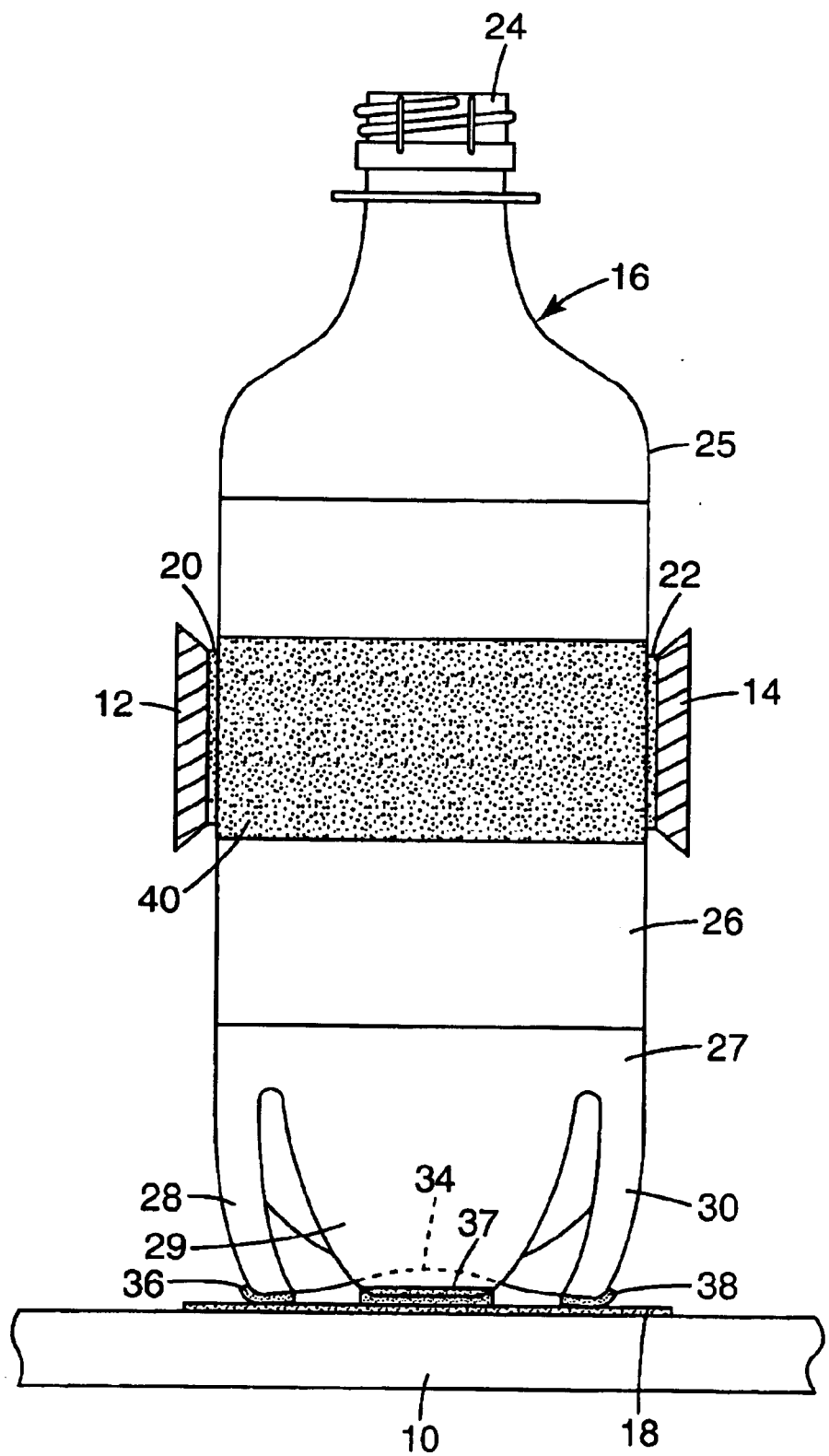
FIG. 1 illustrates in partial cross-section a side view of a plastic beverage container and conveyor partially coated with a lubricant composition of the invention.

The invention relates to a lubricating coating that provides good lubricity to a beverage container or to a conveyor surface for the beverage container, thus enabling proper movement of containers along the conveyor system. The coating is formed by thermal- or radiation-induced curing. The resulting coating is dry to the touch following cure, and relatively water-insoluble (that is, the cured coating will not be washed away when exposed to water). The coating can be reapplied as needed, on the conveyor line if desired, to compensate for coating wear. The lubricant composition does not require in-line dilution with significant amounts of water; that is, it can be applied undiluted or with relatively modest dilution, e.g., at a water:lubricant ratio of about 1:1 to 5:1. In contrast, conventional dilute aqueous lubricants are applied using significant amounts of water, at dilution ratios of about 100:1 to 500:1. The entire container or conveyor can be coated or treated, but it is usually preferred to coat only those portions of the container or conveyor (or both container and conveyor) that come into contact with one another. The lubricant coating preferably is substantially non-dripping prior to cure; that is, preferably, the majority of the lubricant remains on the container or conveyor following application until such time as the lubricant coating is cured.

The invention is further illustrated in FIG. 1, which shows a conveyor belt 10, conveyor chute guides 12, 14 and beverage container 16 in partial cross-sectional view. The container-contacting portions of belt 10 and chute guides 12, 14 are coated with thin layers 18, 20 and 22 of a cured lubricant composition of the invention. Container 16 is constructed of blow-molded PET, and has a threaded end 24, side 25, label 26 and base portion 27. Base portion 27 has feet 28, 29 and 30, and crown portion (shown partially in phantom) 34. Thin layers 36, 37 and 38 of a lubricant composition of the invention cover the conveyor-contacting portions of container 16 on feet 28, 29 and 30, but not crown portion 34. Thin layer 40 of a lubricant composition of the invention covers the conveyor-contacting portions of container 16 on label 26.

A variety of coating compositions can be used. The coating composition typically will include at least one film-forming ingredient that can be cured using thermal cure at less than 200° C. or radiation-induced cure (e.g., UV or visible light cure). Coating compositions that can be thermally cured at less than 200° C. or radiation cured can be applied to and cured in place upon thin-walled plastic beverage containers made of materials such as polyethylene terephthalate (M.P. 260° C.) and polyethylene naphthalate (M.P. 262° C.). For thermally cured film formers, the thermal cure temperature preferably is less than 160° C., and more preferably is less than 120° C. Coating compositions that can be thermally cured at less than 120° C. or radiation cured can be applied to and cured in place upon polyacetal plastic parts, which are commonly employed in beverage conveyors. Suitable film formers include polymerizable or crosslinkable materials that are capable of being hardened and formed into a film. Preferably the film former is radiation-curable, and most preferably it is UV-curable. Film formers that are waterborne or otherwise substantially solvent free (e.g., 100 percent solids low viscosity formulations) are preferred for environmental reasons. Representative film formers include free-radically-polymerizable materials such as butyl acrylate, allyl acrylate, zinc acrylate, 1,6-hexanediol diacrylate, pentaerythritol triacrylate, pentaerythritol tetraacrylate and polymers with vinyl or (meth) acrylate functional units such as those described in U.S. Pat. No. 5,849,462; polymerizable silicone compounds such as trimethylsilylmethacrylate, and poly(acryloxypropylmethyl)siloxane; cationically-polymerizable or crosslinkable materials such as bisphenol-A diglycidyl ether; and monomers, oligomers and polymers that are polymerized or crosslinked through their reactive functional units, such as by the photogenerated 2+2 cycloaddition of poly(vinylidene acetate), curing reactions between bisphenol A-epoxy resin and diethylenetriamine, and condensation reactions of diols and dianhydrides. Preferred film formers include urethanes, acrylics, epoxies, melamines and blends or copolymers thereof. Waterborne UV curable acrylates and urethanes are particularly preferred film formers. Suitable commercially available film formers include UV curable acrylate coatings from UV Coatings Limited; ROSHIELD™ 3120 UV curable acrylate coating from Rohm & Haas; NEORAD™ NR-3709 UV curable aliphatic urethane coating from Zeneca Resins, curable urethane coatings such as those described in U.S. Pat. Nos. 5,453,451 and 5,773,487; COURTMASTER II™ waterborne acrylic urethane, available from Ecolab, Inc.; LAROMER™ PE 55W polyester acrylate, LR 8895 polyester acrylate, LR 8949 aliphatic urethane and LR 8983 aromatic urethane waterborne acrylic ester resins, all available from BASF Corp.; VIAKTIN™ VTE 6155 aliphatic urethane acrylate, VTE 6161 polyester urethane acrylate, VTE 6165 aromatic urethane acrylate and VTE 6169 aliphatic polyester urethane acrylate radiation curing resins, all available from Vianova Resins GmbH &Co. KG; 98-283W urethane acrylate, available from Hans Rahn & Co.; partially acrylated bisphenol-A epoxy resins such as Ebcryl resin 3605 (available from Radcure) and coating compositions such as those described in U.S. Pat. No. 5,830,937. The film former usually represents up to about 99 wt. %, more preferably about 50 to about 97 wt. %, and most preferably about 70 to about 95 wt. % of the final coating weight.

The film former can be used by itself if it provides a sufficiently lubricious surface when cured. Typically, however, the film former will be combined with a liquid, semi-solid or solid lubricant that imparts lubricity to the cured lubricating coating. A variety of lubricants can be used in the invention. The lubricant should provide reduced lubricity between the conveyor and container surfaces and not adversely affect the intended thermal or radiation curability of the lubricating composition. Preferred lubricants include solid materials such as molybdenum disulfide, boron nitride, graphite, silica particles, silicone gums and particles, polytetrafluoroethylene (PTFE) particles, fluoroethylene-propylene copolymers (FEP), perfluoroalkoxy resins (PFA), ethylene-chlorotrifluoroethylene alternating copolymers (ECTFE), poly (vinylidene fluoride) (PVDF), waxes and mixtures thereof. Fatty acids, phosphate esters and mixtures thereof can also be employed. Lubricants containing fluoropolymers such as PTFE are especially preferred. Preferred commercially or experimentally available lubricants include the EVERGLIDE™ and ULTRAGLIDE™ series of micronized wax powders, dispersions and emulsions such as EVERGLIDE UV-636 (25% carnauba wax emulsified in tripropylene glycol diacrylate), EVERGLIDE UV-231 D (35% fluoroethylene wax dispersed in tripropylene glycol diacrylate), ULTRAGLIDE UV-701 (40% PTFE dispersed in tripropylene glycol diacrylate) and ULTRAGLIDE UV-801 (35% PTFE in tridecyl stearate), all commercially available from Shamrock Technologies, Inc.; and the MICROSPERSION™, POLYFLUO™ AND SYNFLUO™ series of micronized waxes such as MICROSPERSION 190-50 50% aqueous dispersion of polyethylene wax and PTFE and POLYFLUO 190 micronized fluorocarbon, all commercially available from Micro Powders Inc. A preferred amount of lubricant is at least about 1 wt. %, more preferably about 3 to about 50 wt. %, and most preferably about 5 to about 30 wt. %, based on the weight of lubricant (exclusive of any carrier or solvent that may have been used to disperse or dissolve the lubricant) in the final cured coating.

If the lubricant composition is thermally curable, then it optionally (and preferably) will include at least one thermal initiator or catalyst to promote polymerization or crosslinking of the film former. A variety of thermal initiators or catalysts can be employed. Examples of suitable thermal initiators or catalysts include peroxides such as benzoyl peroxide, dicumyl peroxide and t-butyl perbenzoate; and azo compounds such as 2,2'-azobisisobutyronitrile, 1,1'-azobis (1-cyclo-hexanecarbonitrile) and 2,2'-azobis(isobutyramide) dihydrate. The amount of thermal initiator or catalyst that should be employed will depend in part on the efficiency of the initiator or catalyst and on the thickness of the lubricant coating. Preferably, the thermal initiator or catalyst will be present in an amount of about 0.01% to about 15 wt. % of the coating, more preferably about 0.5% to 10 wt. % of the coating.

If the lubricant composition is radiation curable, then it optionally (and preferably) will include at least one photoinitiator to promote polymerization or crosslinking of the film former. A variety of photoinitiators can be employed. Photoinitiators that become active when exposed to radiation over some portion of the spectrum between 200 and 1200 nm (e.g., ultraviolet, visible-light and infrared radiation) are preferred, and more preferably those that become active over some portion of the spectrum between 250 and 850 nm. Examples of suitable visible-light and ultraviolet induced photoinitiators include benzil, benzoin, acyloins, acyloin ethers, and ketones such as 2-methyl-1-[4-(methylthio)phenyl]-2-morpholino propan-1-one (commercially available from Ciba Specialty Chemicals as IRGACURE™ 907), 2,2-dimethoxy-2-phenylacetophenone (commercially available from Ciba Specialty Chemicals as IRGACURE™ 651), 2-benzyl-2-N,N-dimethylamino-1-(4-morphomophenyl)-1-butanone (commercially available from Ciba Specialty Chemicals as IRGACURE™369) and 1-hydroxycyclohexyl phenyl ketone (commercially available from Ciba Specialty Chemicals as IRGACURE™ 184). Also useful are sensitized and non-sensitized diaryliodonium salts and triarylsulfonium salts; iron-arene complexes such as (n5-2,4-cyclopentadien-1-y10[1,2,3,4,5,6-n)-(1-methyl ethyl)benzene]-iron(+)-hexafluorophosphate(−1) (commercially available from Ciba Specialty Chemicals as IRGACURE™ 261); and thiol-ene systems based on the reaction of thiols with olefinic double bonds, such as n-pentylmercaptan. The photoinitiators can be used alone or with suitable accelerators (e.g., amines or peroxides) or with suitable sensitizers (e.g., ketone or alpha-diketone compounds such as camphorquinone). The amount of photoinitiator that should be employed will depend in part on the efficiency and other characteristics of the photoinitiator and energy source, and on the thickness of the lubricant coating. Preferably, the photoinitiator will be present in an amount of about 0.01% to about 10 wt. % of the coating, more preferably about 0.5% to 5 wt. % of the coating.

The lubricant composition can include additional components to provide desired properties. For example, the lubricant compositions can contain adjuvants such as antimicrobial agents, colorants, foam inhibitors or foam generators, plasticizers, adhesion promoters, cracking inhibitors (such as PET stress cracking inhibitors), viscosity modifiers, solvents, antioxidants, coating aids, antistatic agents, and surfactants. The amounts and types of such additional components will be apparent to those skilled in the art. For applications involving plastic containers, care should be taken to avoid the use of components or contaminants that might promote environmental stress cracking in plastic containers when evaluated using the PET Stress Crack Test set out below.

For applications involving plastic containers, the lubricant compositions preferably have a total alkalinity equivalent to less than about 100 ppm CaCO3, more preferably less than about 50 ppm CaCO3, and most preferably less than about 30 ppm CaCO3, as measured in accordance with Standard Methods for the Examination of Water and Wastewater, 18th Edition, Section 2320, Alkalinity.

A variety of kinds of conveyors and conveyor parts can be coated with the lubricant composition. Parts of the conveyor that support or guide or move the containers and thus are preferably coated with the lubricant composition include belts, chains, gates, chutes, sensors, and ramps having surfaces made of fabrics, metals, plastics, composites, or combinations of these materials.

The lubricant composition can also be applied to a wide variety of containers including beverage containers; food containers; household or commercial cleaning product containers; and containers for oils, antifreeze or other industrial fluids. The containers can be made of a wide variety of materials including glasses; plastics (e.g., polyolefins such as polyethylene and polypropylene; polystyrenes; polyesters such as PET and polyethylene naphthalate (PEN); polyamides, polycarbonates; and mixtures or copolymers thereof); metals (e.g., aluminum, tin or steel); papers (e.g., untreated, treated, waxed or other coated papers); ceramics; and laminates or composites of two or more of these materials (e.g., laminates of PET, PEN or mixtures thereof with another plastic material). The containers can have a variety of sizes and forms, including cartons (e.g., waxed cartons or TETRAPACK™ boxes), cans, bottles and the like. Although any desired portion of the container can be coated with the lubricant composition, the lubricant composition preferably is applied only to parts of the container that will come into contact with the conveyor or with other containers. Preferably, the lubricant composition is not applied to portions of thermoplastic containers that are prone to stress cracking. In a preferred embodiment of the invention, the lubricant composition is applied to the crystalline foot portion of a blow-molded, footed PET container (or to one or more portions of a conveyor that will contact such foot portion) without applying significant quantities of lubricant composition to the amorphous center base portion of the container. Also, the lubricant composition preferably is not applied to portions of a container that might later be gripped by a user holding the container, or, if so applied, is preferably removed from such portion prior to shipment and sale of the container. For some such applications the lubricant composition preferably is applied to the conveyor rather than to the container, in order to limit the extent to which the container might later become slippery in actual use.

The lubricant composition can be a liquid or semi-solid at the time of application. Preferably, the lubricant composition is a liquid having a viscosity that will permit it to be pumped and readily applied to a conveyor or containers, and that will facilitate rapid film formation and curing whether or not the conveyor is in motion. The lubricant composition can be formulated so that it exhibits shear thinning or other pseudoplastic behavior, manifested by a higher viscosity (e.g., non-dripping behavior) when at rest, and a much lower viscosity when subjected to shear stresses such as those provided by pumping, spraying or brushing the lubricant composition. This behavior can be brought about by, for example, including appropriate types and amounts of thixotropic fillers (e.g., treated or untreated fumed silicas) or other rheology modifiers in the lubricant composition. The lubricant coating can be applied in a constant or intermittent fashion. Preferably, the lubricant coating is applied in an intermittent fashion in order to minimize the amount of applied lubricant composition. For example, the lubricant composition can be applied for a period of time during which at least one complete revolution of the conveyor takes place and then cured in place. Application of the lubricant composition can then be halted for a period of time (e.g., minutes or hours) and then resumed for a further period of time (e.g., one or more further conveyor revolutions). The cured lubricant coating should be sufficiently thick to provide the desired degree of lubrication, and sufficiently thin to permit economical operation and to discourage drip formation. The lubricant coating thickness preferably is maintained at at least about 0.0001 mm, more preferably about 0.001 to about 2 mm, and most preferably about 0.005 to about 0.5 mm.

Application of the lubricant composition can be carried out using any suitable technique including spraying, wiping, brushing, drip coating, roll coating, and other methods for application of a thin film. If desired, the lubricant composition can be applied using spray equipment designed for the application of conventional aqueous conveyor lubricants, modified as need be to suit the substantially lower application rates and preferred non-dripping coating characteristics of the lubricant compositions used in the invention. For example, the spray nozzles of a conventional beverage container lube line can be replaced with smaller spray nozzles or with brushes, or the metering pump can be altered to reduce the metering rate.

If the lubricant composition is thermally curable, then it can be cured using a variety of energy sources that will generate sufficient heat to initiate and promote hardening of the lubricant coating, while staying within the thermal cure temperature limits noted above. Suitable sources include conventional heaters, infrared radiation sources, and microwave energy sources.

If the lubricant composition is radiation curable, then it can be cured using a variety of energy sources that will induce a photochemical reaction and thereby harden the film former, including ultraviolet radiation, visible light, infrared radiation, X-rays, gamma rays, and electron beams. Preferred energy sources include mercury vapor arc lamps, fluorescent lamps, tungsten halide lamps, visible lasers and infrared lamps.

For example, a UV-cured solid lubricant coating can be obtained on the bottom of a container by passing the container through a coating station to apply photosensitive solution to the bottom of the container and photoexposing the solution to cure the lubricant coating. Photoexposure can be carried out from underneath the container by transmitting the curing energy through the conveyor belt. In such a case, the conveyor belt should be sufficiently transparent to the desired wavelength of curing energy so that efficient cure will take place. Also, the coated container can be photoexposed from above or from one or more sides of the container. In such a case, the container should be sufficiently transparent to the desired wavelength of curing energy so that efficient cure will take place.

The lubricant compositions can, if desired, be evaluated using a Rotating Disc Frictional Test and a PET Stress Crack Test.

Rotating Disc Frictional Test

Lubricity can be evaluated by measuring the drag force (frictional force) of various weighted cylinders riding on a rotating polyacetal disc. The disc is uncoated or coated with a cured sample of the tested lubricating composition. The cylinders are made of glass, aluminum or PET, and have respective weights of 88.8 g, 125.9 g and 135.5 g. Drag force is determined using a solid state transducer connected to the cylinder via a thin, flexible string. Relative coefficient of friction (Rel COF) values are calculated using the equation Rel COF=COF(sample)/COF(uncoated)=drag force (sample)/drag force (uncoated). A Rel COF value less than 1 indicates that the tested material served as a lubricating composition, with lower values indicating better lubricity.

PET Stress Crack Test

Standard 2-liter PET beverage bottles (commercially available from Constar International) are charged with 1850 g of chilled water, 31.0 g of sodium bicarbonate and 31.0 g of citric acid. The charged bottle is capped, rinsed with deionized water and set on clean paper towels overnight. The bottoms of 12 bottles are dipped in a 200 g sample of the undiluted lube in a 125×65 mm crystal dish, then cured using an appropriate energy source, placed in a bin and stored in an environmental chamber at 37.8° C., 90% relative humidity for 14 days. The bottles are removed from the chamber, observed for crazes, creases and crack patterns on the bottom. The aged bottles are compared with 12 control bottles that are exposed to a standard dilute aqueous lubricant (LUBODRIVE™ RX, commercially available from Ecolab) prepared as follows. A 1.7 wt. % solution of the LUBODRIVE lubricant (in water containing 43 ppm alkalinity as $CaCO_3$) is foamed for several minutes using a mixer. The foam is transferred to a lined bin and the control bottles are dipped in the foam. The bottles are aged in the environmental chamber as outlined above.

The invention can be better understood by reviewing the following examples. The examples are for illustration purposes only, and do not limit the scope of the invention.

EXAMPLE 1

UV-Cured Lubricating Coating

Two parts CN981 B88 acrylate blend (urethane acrylate and 1,6 hexanediol diacrylate, commercially available from Sartomer, Inc.), 4 parts ULTRAGLIDE UV-701 wax dispersion (40% PTFE dispersed in tripropylene glycol diacrylate, commercially available from Shamrock Technologies, Inc.), 0.3 parts IRGACURE 907 photoinitiator (2-methyl-1-[4-(methylthio)phenyl]-2-morpholino propan-1-one, commercially available from Ciba Specialty Chemicals) and 14 parts isopropyl alcohol were well mixed. Excluding the isopropyl alcohol, the resulting lubricating composition contained 25.4 wt. % PTFE particles in a photocurable film former. The lubricating composition was evaluated using the Rotating Disc Frictional Test by wiping the composition onto the polyacetal disc, drying the composition and photocuring it for 60 sec under a nitrogen atmosphere using a Xenon-pulsed UV curing unit, Model RC-600 (commercially available from Xenon Corp.). In a comparison run, three commercially available conventional aqueous conveyor lubricants were diluted to 0.25 wt. % in soft water and applied to the uncoated rotating disc. The following relative COF values were obtained:

| Substrate | Aqueous Lube 1[1] | Aqueous Lube 2[2] | Aqueous Lube 3[3] | Example 1 Lube |
|---|---|---|---|---|
| Glass | 0.66 | 0.92 | 0.88 | 0.77 |
| Aluminum | 0.50 | 0.53 | 0.62 | 0.83 |
| PET | 0.63 | 0.62 | 0.47 | 0.71 |

[1]LUBODRIVE ™ RX, commercially available from Ecolab
[2]DICOLUBE ™ PL, commercially available from DiverseyLever
[3]WEST GLIDE ™ PET, commercially available from West Agro, Inc.

This example showed that the dry film lubricant composition of Example 1 served as a lubricant on all three substrates and had better performance on glass than two of the three comparison dilute aqueous lubricants.

EXAMPLE 2

UV-Cured Lubricating Coating

Using the method of Example 1, 42.86 parts VIATKIN VTE 6165 aromatic urethane acrylate resin (commercially available from Vianova Resins GmbH &Co. KG), 10 parts MICROSPERSION 190-150 50% aqueous dispersion of polyethylene wax and PTFE (commercially available from Micro Powders Inc.), 1.57 parts IRGACURE 500 photoinitiator (commercially available from Ciba Specialty Chemicals), 0.1 parts PI-35™ defoamer (commercially available from Ultra Additives, Inc.), 0.05 parts FC-120™ fluorinated wetting agent (commercially available from 3M) and 53.32 parts deionized water were well mixed. Excluding the deionized water, the resulting lubricating composition contained a total of 10 wt. % polyethylene wax and PTFE particles in a waterborne photocurable film former. The lubricating composition was evaluated using the Rotating Disc Frictional Test as in Example 1. Relative COF values of 0.73, 0.64 and 0.59 were obtained on glass, aluminum and PET, respectively. This example showed that the dry film lubricant composition of Example 2 served as a lubricant on all three substrates, and had better performance on glass and on PET than two of the three comparison dilute aqueous lubricants.

EXAMPLE 3

UV-Cured Lubricating Coating

Using the method of Example 1, 86 parts VIATKIN VTE 6161 polyester urethane acrylate (commercially available from Vianova Resins GmbH &Co. KG), 53.32 parts POLY-FLUO™ 190 micronized fluorocarbon (commercially available from Micro Powders Inc.), 4 parts IRGACURE 500 photoinitiator (commercially available from Ciba Specialty Chemicals) and 80 parts acetone were well mixed. Excluding the acetone, the resulting lubricating composition contained 37 wt. % fluorocarbon particles in a solvent-borne photocurable film former. The lubricating composition was evaluated using the Rotating Disc Frictional Test as in Example 1. Relative COF values of 0.84, 0.76 and 0.74 were obtained on glass, aluminum and PET, respectively. This example showed that the dry film lubricant composition of Example 3 served as a lubricant on all three substrates, and had better performance on glass than two of the three comparison dilute aqueous lubricants.

EXAMPLE 4

UV-Cured Lubricating Coating

Using the method of Example 2, a lubricating composition was prepared by substituting 10 parts NANOFLON AQ-60 60% aqueous dispersion of PTFE particles (commercially available from Shamrock Technologies, Inc.) in place of the MICROSPERSION 190-150 PTFE dispersion used in Example 2. Excluding the deionized water, the resulting lubricating composition contained 11.9 wt. % PTFE particles in a waterborne photocurable film former. The lubricating composition was evaluated using the Rotating Disc Frictional Test as in Example 1. Relative COF values of 0.88, 0.86 and 0.79 were obtained on glass, aluminum and PET, respectively. This example showed that the dry film lubricant composition of Example 4 served as a lubricant on all three substrates, and had better performance on glass than one of the three comparison dilute aqueous lubricants and equal performance on glass to one of the other comparison dilute aqueous lubricants.

EXAMPLE 5

UV-Cured Lubricating Coating

Using the method of Example 4, a lubricating composition was prepared by substituting 53.32 parts ULTRA-GLIDE UV-701 wax dispersion in place of the POLY-FLUO™ 190 micronized fluorocarbon used in Example 2. Excluding the acetone, the resulting lubricating composition contained 14.8 wt. % PTFE particles in a solvent-borne photocurable film former. The lubricating composition was evaluated using the Rotating Disc Frictional Test as in Example 1. Relative COF values of 1.16, 1.00 and 0.91 were obtained on glass, aluminum and PET, respectively. This example showed that the dry film lubricant composition of Example 5 served as a lubricant on PET.

EXAMPLE 6

UV-Cured Lubricating Coating

Using the method of Example 1, 5 parts CN981 B88 acrylate blend, 20 parts EVERGLIDE UV-636 25% emulsion of carnauba wax in tripropylene glycol diacrylate (commercially available from Shamrock Technologies, Inc.), 1.25 parts IRGACURE 907 photoinitiator and 0.125 parts isopropyl thioxanthone (commercially available from Ciba Specialty Chemicals) can be well mixed. The resulting lubricating composition would contain 18.3 wt. % carnauba wax in a photocurable film former.

EXAMPLE 7

Thermally-Cured Lubricating Coating

Using the method of Example 1, 5 parts CN981 B88 acrylate blend, 20 parts EVERGLIDE UV-636 carnauba wax emulsion and 1.5 parts LUPERSOL™ 757 (t-amylperoxy-2ethyl-hexanoate, commercially available from ATOCHEM) can be well mixed. The resulting lubricating composition would contain 18.9 wt. % carnauba wax in a thermally-curable film former.

Various modifications and alterations of this invention will be apparent to those skilled in the art without departing from the scope and spirit of the invention, and are intended to be within the scope of the following claims.

We claim:

1. A plastic beverage container whose surface is coated at least in part with a coating that has been thermally cured at less than 200° C. or radiation-cured, whereby the cured coating forms a lubricant layer on the surface of the container.

2. A container according to claim 1, wherein the container comprises crystalline and amorphous portions and the cured coating forms a lubricant layer on the surface of one or more of the crystalline portions but not on significant amorphous portions of the container.

3. A container according to claim 2, wherein one or more foot portions of a blow-molded, footed polyethylene terephthalate container are coated with the coating.

4. A container according to claim 1, wherein the coated surface is UV-cured.

5. A container according to claim 1, wherein the coating has a thickness of about 0.001 to about 2 mm.

6. A container according to claim 1, wherein the coating comprises a film former selected from urethanes, acrylics, epoxies, melamines and blends or copolymers thereof, together with a lubricant selected from molybdenum disulfide, boron nitride, graphite, silica particles, silicone gums and particles, polytetrafluoroethylene particles, fluoroethylene-propylene copolymers, perfluoroalkoxy resins, ethylene-chlorotrifluoroethylene alternating copolymers, poly (vinylidene fluoride), waxes, fatty acids, phosphate esters and mixtures thereof.

7. A container according to claim 6, wherein the coating comprises about 50 to about 97 wt. % film former and about 3 wt. % to about 50 wt. % lubricant.

8. A container according to claim 6, wherein the coating comprises about 70 to about 95 wt. % film former and about 5 wt. % to about 30 wt. % lubricant.

9. A container according to claim 1, wherein the coating comprised a waterborne UV curable acrylate or urethane or a blend or copolymer thereof, together with a lubricant comprising polytetrafluoroethylene particles.

10. A container according to claim 1, wherein the coating has a total alkalinity equivalent to less than about 50 ppm $CaCO_3$.

11. A conveyor used to transport beverage containers, having a conveying surface comprising polyacetal coated at least in part with a coating that has been thermally cured or radiation-cured, whereby the coating forms a lubricant layer on the conveyor.

12. A conveyor according to claim 11, wherein the coating comprises a film former selected from urethanes, acrylics, epoxies, melamines and blends or copolymers thereof, together with a lubricant selected from molybdenum disulfide, boron nitride, graphite, silica particles, silicone gums and particles, polytetrafluoroethylene particles, fluoroethylene-propylene copolymers, perfluoroalkoxy resins, ethylene-chlorotrifluoroethylene alternating copolymers, poly (vinylidene fluoride), waxes, fatty acids, phosphate esters and mixtures thereof.

13. A conveyor according to claim 11, wherein the coating has been thermally cured at less than 120° C.

14. A thermal or radiation curable conveyor lubricating composition comprising a film former that can be thermally cured at less than 200° C. or radiation-cured, a thermal initiator or photoinitiator, and more than 5 weight percent of lubricating fluoropolymer particles.

15. A composition according to claim 14, comprising about 50 up to about 95 wt. % film former and up to about 50 wt. % fluoropolymer particles.

16. A composition according to claim 14, comprising about 70 to about 95 wt. % film former and up to about 30 wt. % fluoropolymer particles.

17. A composition according to claim 14, wherein the film former comprises a waterborne UV curable acrylate or urethane or a blend or copolymer thereof.

18. A conveyor according to claim 11, wherein the coating has been UV-cured.

19. A conveyor according to claim 11, wherein the coating has a thickness of about 0.001 to about 2 mm.

20. A conveyor according to claim 11, wherein the coating comprised a waterborne UV curable acrylate or urethane or a blend or copolymer thereof, together with a lubricant comprising polytetrafluoroethylene particles.

21. A conveyor according to claims 12, wherein the coating comprises about 50 to about 97 wt. % film former and about 3 wt. % to about 50 wt. % lubricant.

22. A conveyor according to claim 12, wherein the coating comprises about 70 to about 95 wt. % film former and about 5 wt. % to about 30 wt. % lubricant.

* * * * *